UNITED STATES PATENT OFFICE.

S. T. ARMSTRONG AND C. J. GILBERT, OF NEW YORK, N. Y.

IMPROVEMENT IN THE PROCESS OF WORKING GUTTA-PERCHA.

Specification forming part of Letters Patent No. 7,643, dated September 17, 1850.

*To all whom it may concern:*

Be it known that we, SAMUEL T. ARMSTRONG and C. J. GILBERT, of the city, county, and State of New York, have invented a new and useful Improvement in the Manufacture of Gutta-Percha; and we do hereby declare that the following is a full, clear, and exact description of the principle or character which distinguishes our invention from all other things before known, and of the method of making and using the same.

We have discovered as the result of long experience in the manufacture of articles from gutta-percha that it undergoes a change which in a short time destroys all its good qualities. Instead of preserving its strength, it soon becomes so brittle as to be worthless for nearly if not all practical purposes. It is believed that the heat to which it is exposed during the processes of manufacture—such as grinding and rolling it between heated calendering-rollers—induces a chemical change which destroys its original properties. Whatever may be the cause, the fact of the rapid loss of all its good qualities is fully established by actual experience. The many useful qualities which this substance possesses for application to the arts and the purposes of life have induced us to direct our attention to the investigation of its properties, and to institute experiments with the view to discover some mode of treatment by which its good qualities could be rendered permanent, or at least sufficiently lasting to be practically useful. We have discovered that it is necessary to neutralize the acids contained in crude gutta-percha before its good qualities can be preserved, and that lime is the most valuable agent in effecting this change.

The nature of our invention, and that which distinguishes it from all other things before known in the arts, consists in the use of lime or other alkali with heat to neutralize the acids contained in native or crude gutta-percha, and thus preserve and render more permanent its useful properties; and our invention also consists in compounding lime with gutta-percha for the purpose of improving its qualities and preserving it wholly or partly from deterioration and protecting it against the action of heat and the atmosphere.

The crude or native gutta-percha is reduced by cutting or otherwise into small fragments, and then washed or cleansed in pure cold water in the manner heretofore practiced. We then prepare a bath of lime and cold water by mixing as much lime in the water as will be held in suspension when agitated, such as is commonly known as "milk of lime." The previously-washed fragments of gutta-percha are then boiled in the bath of lime-water from one to four hours, the length of time depending on the quality of the gutta-percha, the more impure requiring the greater length of time; but we have never met with any quality of this substance which required more than four hours' boiling. This completes the treatment under the first part of our invention. After being thus treated the gutta-percha is in a proper condition to be masticated and worked in the usual or any other appropriate manner.

The process above described has the effect of neutralizing the acids contained in the crude or native gutta-percha, the presence of which we believe destroys in a short time the good qualities of this otherwise valuable substance.

It will be obvious that other alkalies may be substituted for the lime in this the first part of our invention; but in all our experiments we have found no alkaline substance so good as lime for the purposes required. We do not, however, wish to be understood as limiting ourselves to the use of lime in this part of our invention.

We are aware that it has been stated that in some instances gutta-percha has been treated with alkalies to remove bad odors from it; but as this substance as found in the markets possesses no odor, when it has heretofore been treated with alkalies to remove bad odors it must have been in the case of specimens in which decomposition of some sort had been induced, and therefore we do not claim simply the use of alkalies in the cleansing of gutta-percha, except when applied for the purpose of and in such manner as to neutralize the acid or acids contained in the native or crude gutta-percha.

In applying the second part of our invention we take the gutta-percha, either after it has been treated under the first part of our invention or without such previous treatment. After the gutta-percha has been properly reduced into fragments during the process of mastication or grinding conducted in any of the known ways we mix with from five to fifty per centum, by weight, of lime, which has been previously slaked in water, and grind the whole together by passing it between heated rollers, which move with different degrees of velocity, such as have been heretofore and are now generally used in masticating gutta-percha. In this process of masticating or grinding, the gutta-percha becomes soft and plastic and the lime becomes thoroughly amalgamated or mixed with it, and it can then be manufactured in the manner heretofore practiced or in any other manner desired.

Instead of mixing the lime with the gutta-percha by means of the heated rollers, it may be done in any other manner—such, for instance, as mixing it with the gutta-percha after it has been dissolved in naphtha or its other solvents; but we deem it best to mix the two substances while the gutta-percha is rendered plastic by heat.

The proportion of lime to be mixed will depend in a great measure on the uses to which the compound is to be applied. The greater the proportion of lime the harder will be the compound; but it is not advisable under any circumstances to make the proportion of lime more than fifty per centum.

The presence of lime in gutta-percha not only preserves it from deterioration, but adds greatly to its tenacity and durability, and renders it less susceptible to the softening effects of heat below certain degrees.

The lime can be applied either in the moist or dry state, as the heat applied in the process of masticating or grinding will expel the moisture.

What we claim as our invention, and desire to secure by Letters Patent under the first part of our invention, consists in—

1. The use of lime or other alkaline substance with heat, in the manner substantially as herein described, in the cleansing of gutta-percha to neutralize the acid or acids contained in that substance in its crude or native state, and thus preserve and render more permanent its useful properties, as specified.

2. In the second part of our invention, compounding lime with gutta-percha, substantially as herein described, for the purpose of improving its qualities, preserving it wholly or partly from deterioration, and protecting it against the injurious effects of the atmosphere and heat, subtantially as described.

S. T. ARMSTRONG.
CHAS. J. GILBERT.

Witnesses:
  CHS. M. KELLER,
  EDMD. BROWNE.